US009826419B2

United States Patent
Kotkar et al.

(10) Patent No.: US 9,826,419 B2
(45) Date of Patent: Nov. 21, 2017

(54) OPTIMIZED CELL ACQUISITION FOR LTE TDD SYSTEMS OR CSG/EMBMS CAPABLE UES

(71) Applicant: QUALCOMM Incorporated, San Diego, CA (US)

(72) Inventors: Pratik Kotkar, San Diego, CA (US); Alexei Yurievitch Gorokhov, San Diego, CA (US); Sachin Saraswat, San Diego, CA (US); Ning Yin, San Diego, CA (US); Srinivasan Rajagopalan, San Diego, CA (US); Muralidharan Murugan, San Diego, CA (US); Santosh Kumar Rongala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/685,347

(22) Filed: Apr. 13, 2015

(65) Prior Publication Data

US 2015/0296391 A1    Oct. 15, 2015

Related U.S. Application Data

(60) Provisional application No. 61/979,962, filed on Apr. 15, 2014.

(51) Int. Cl.
*H04W 24/02* (2009.01)
*H04L 5/14* (2006.01)
(Continued)

(52) U.S. Cl.
CPC ........... *H04W 24/02* (2013.01); *H04L 1/1812* (2013.01); *H04L 5/14* (2013.01); *H04L 65/4076* (2013.01);
(Continued)

(58) Field of Classification Search
CPC . H04W 24/02; H04W 48/16; H04W 52/0219; H04W 52/0229; H04W 84/045; H04L 5/14; H04L 1/1812; H04L 65/4076
(Continued)

(56) References Cited

U.S. PATENT DOCUMENTS

2010/0113038 A1    5/2010  Eskicioglu et al.
2011/0294493 A1*  12/2011  Nagaraja ............. H04J 11/0069
                                                           455/422.1
(Continued)

FOREIGN PATENT DOCUMENTS

EP    2346286 A1    7/2011
EP    2675213 A1   12/2013
(Continued)

OTHER PUBLICATIONS

3GPP TS 36 .331: "3rd Generation Partnership Project; Technical Specification Group Radio Access Network; Evolved Universal Terrestrial Radio Access (E-UTRA); Radio Resource Control (RRC); Protocol specification (Release 12)", 3rd Generation Partnership Project (3GPP), Mobile Competence Centre ; 650, Route Des Lucioles ; F-06921 Sophia-Antipolis Cedex; France, vol . Ran WG2, No. V12.1.0, Mar. 19, 2014 , pp. 1-356, XP050769960, [retrieved on Mar. 19, 2014] paragraphs [5.2.2.1]—[5.2.2.2] paragraph [5.3.7.2] paragraph [5.3.11] paragraph [5 .6.11].
(Continued)

*Primary Examiner* — Charles C Jiang
*Assistant Examiner* — Wali Butt
(74) *Attorney, Agent, or Firm* — Anthony R. Morris

(57) ABSTRACT

Techniques for optimized cell acquisition for long term evolution (LTE) time division duplex (TDD) systems or closed subscriber group (CSG)/evolved Multicast Broadcast Multimedia Service (eMBMS) capable user equipments (UEs) are disclosed. A UE obtains configuration informa-
(Continued)

FIG. 1 tion, CSG capability information, and/or eMBMS capability information for a cell. The UE also stores the obtained information for the cell in a cell information database. In some aspects, the UE may employ the CSG and/or eMBMS capability information to select a weaker cell, during initial frequency scan at power up of the UE, based on cell capability. Additionally or alternatively, the UE may employ the configuration information to determine an initial mutual information (Mi) hypothesis value for physical hybrid-automatic repeat request (HART) indicator channel (PHICH) group mapping of the cell. Additionally or alternative, radio link failures and/or out of synch events may be predicted and proactive responses employed based on previously obtained solutions.

24 Claims, 5 Drawing Sheets

(51) Int. Cl.
  *H04L 1/18* (2006.01)
  *H04L 29/06* (2006.01)
  *H04W 48/16* (2009.01)
  *H04W 84/04* (2009.01)
  *H04W 52/02* (2009.01)

(52) U.S. Cl.
  CPC ....... *H04W 48/16* (2013.01); *H04W 52/0219* (2013.01); *H04W 52/0229* (2013.01); *H04W 84/045* (2013.01); *Y02B 60/50* (2013.01)

(58) Field of Classification Search
  USPC ............... 370/241, 252, 254, 312, 328, 342; 455/422.1, 434, 436, 452.2, 456.1, 517, 455/67.14
  See application file for complete search history.

(56) References Cited

U.S. PATENT DOCUMENTS

| | | |
|---|---|---|
| 2012/0236776 A1* | 9/2012 | Zhang .................. H04W 48/12 370/312 |
| 2013/0039342 A1 | 2/2013 | Kazmi |
| 2013/0156004 A1 | 6/2013 | Swaminathan et al. |
| 2013/0294316 A1 | 11/2013 | Amerga et al. |
| 2013/0294321 A1 | 11/2013 | Wang et al. |
| 2014/0031037 A1 | 1/2014 | Jain et al. |
| 2015/0024743 A1* | 1/2015 | Zheng .................. H04W 48/16 455/434 |
| 2015/0092583 A1* | 4/2015 | Balraj .................. H04L 1/0003 370/252 |
| 2015/0110041 A1* | 4/2015 | Ren ....................... H04W 16/14 370/329 |

FOREIGN PATENT DOCUMENTS

| | | |
|---|---|---|
| EP | 2736284 A1 | 5/2014 |
| GB | 2472791 A | 2/2011 |
| WO | WO-2009115897 A1 | 9/2009 |
| WO | WO-2010058076 A1 | 5/2010 |
| WO | WO-2011041754 A1 | 4/2011 |
| WO | WO-2011066463 A2 | 6/2011 |
| WO | WO-2013026319 A1 | 2/2013 |

OTHER PUBLICATIONS

3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3rd Generation Partnership Project (3GPP), Mobile Competence Centre ; 650, Route Des Lucioles ; F-06921 Sophia-Antipolis Cedex; France, vol. RAN WG2, No. V12.1 .0, Mar. 19, 2014, pp. 1-209, XP050769957, [retrieved on Mar. 19, 2014] chapter 10.1.1.

International Search Report and Written Opinion—PCT/US2015/025788—ISA/EPO—dated Oct. 14, 2015.

* cited by examiner

US 9,826,419 B2

OPTIMIZED CELL ACQUISITION FOR LTE TDD SYSTEMS OR CSG/EMBMS CAPABLE UES

CROSS-REFERENCE TO RELATED APPLICATIONS

This application claims the benefit of U.S. Provisional Patent Application No. 61/979,962, entitled, "OPTIMIZED CELL ACQUISITION FOR LTE TDD SYSTEMS OR CSG/eMBMS CAPABLE UEs", filed on Apr. 15, 2014, which is expressly incorporated by reference herein in its entirety.

BACKGROUND

Field

Aspects of the present disclosure relate generally to wireless communication systems, and more particularly, to optimized cell acquisition for long term evolution (LTE) time division duplex (TDD) systems or closed subscriber group (CSG)/evolved Multicast Broadcast Multimedia Service (eMBMS) capable user equipments (UEs).

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Techniques for optimized cell acquisition for long term evolution (LTE) time division duplex (TDD) systems or closed subscriber group (CSG)/evolved Multicast Broadcast Multimedia Service (eMBMS) capable user equipments (UEs) are disclosed.

In an aspect, a method for wireless communication includes obtaining, by a user equipment (UE), at least one of configuration information, closed subscriber group (CSG) capability information, or evolved Multimedia Broadcast Multicast Service (eMBMS) capability information for a cell. The method also includes storing, by the UE, the obtained information for the cell in a cell information database.

In another aspect, an apparatus for wireless communication includes means for obtaining, by a user equipment (UE), at least one of configuration information, closed subscriber group (CSG) capability information, or evolved Multimedia Broadcast Multicast Service (eMBMS) capability information for a cell. The apparatus also includes means for storing, by the UE, the obtained information for the cell in a cell information database.

In an additional aspect, a computer-readable medium has program code stored thereon. The program code, when executed by one or more computers, causes the one or more computers to obtain, by a user equipment (UE), at least one of configuration information, closed subscriber group (CSG) capability information, or evolved Multimedia Broadcast Multicast Service (eMBMS) capability information for a cell. The program code, when executed by the one or more computers, also causes the one or more computers to store, by the UE, the obtained information for the cell in a cell information database.

In a further aspect, an apparatus configured for wireless communication, comprises one or more processors, and at least one memory coupled to the one or more processors. The at least one processor is one or more processors are configured to obtain, by a user equipment (UE), at least one of configuration information, closed subscriber group (CSG) capability information, or evolved Multimedia Broadcast Multicast Service (eMBMS) capability information for a cell. The one or more processors are additionally configured to store, by the UE, the obtained information for the cell in a cell information database.

Various aspects and features of the disclosure are described in further detail below.

DETAILED DESCRIPTION

Figure 1:
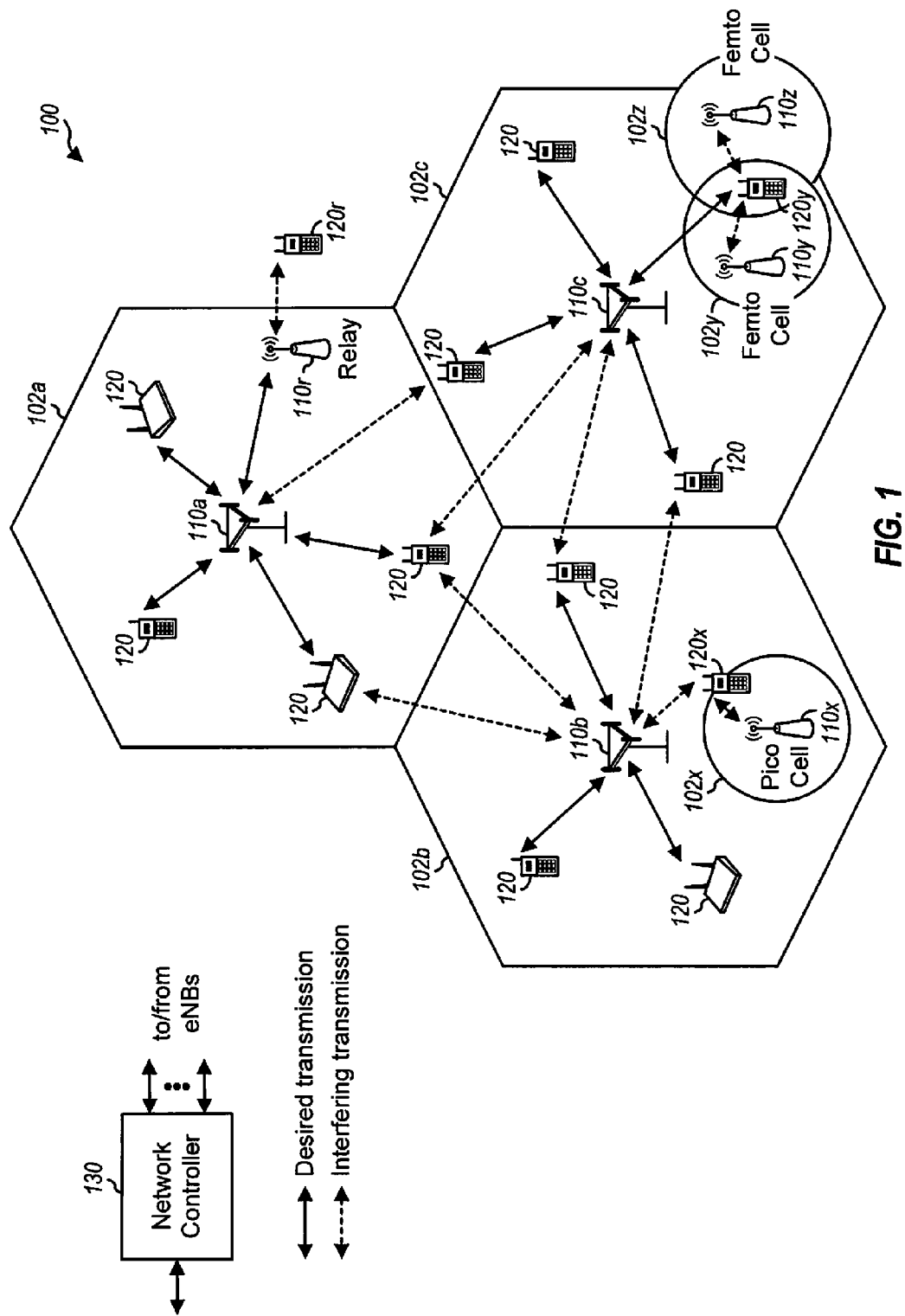
FIG. 1 is a block diagram illustrating an example of a telecommunications system.

The long term evolution (LTE) standards have generally specified two frame structure types for downlink and uplink transmissions. For frame structure type 2 LTE time division duplex (TDD), the standards define seven different uplink-downlink configurations (UL/DL) which have varying uplink and downlink subframe assignments. The particular UL/DL configuration is generally broadcast in System Information Block (SIB) Type 1 (SIB1) by each LTE TDD network. For acquisition to a LTE TDD system, the UE may be faced with the task of decoding SIB1. Master Information Block (MIB), SIB1, and SIB Type 2 (SIB2) messages typically enable the UE to acquire LTE service on a network. However, to decode SIB1, the UE may decode the corresponding Physical Downlink Control Channel (PDCCH), followed by the data on Physical Downlink Shared Channel (PDSCH). In order to perform the PDCCH decode, the UE would generally map the resource elements of the LTE system for the various physical channels (e.g., Physical Hybrid Automatic Repeat Request (HARQ) Indicator channel (PHICH)), Physical Control Format Indicator Channel (PCFICH), and/or PDCCH).

In LTE TDD systems, each UL/DL configuration may have a pre-defined Physical HARQ Indicator mapping based on a mutual information (Mi) hypothesis value that may be unique for each UL/DL configuration per subframe. However prior to decoding SIB1, the UE may be unaware of the Mi value corresponding to the LTE TDD system. Thus, the UE may perform blind decoding using all of the possible Mi hypothesis values (i.e., 0, 1, and 2) in order to decode the PDCCH corresponding to SIB1 of the LTE TDD system.

During initial frequency scan during power up, today's UEs prioritize the highest energy cell for initial cell acquisition. However, the UE may then need to reselect to another cell having desired capabilities, such as closed subscriber group (CSG) capability and/or evolved Multimedia Broadcast Multicast Service (eMBMS) capability. This need to reselect to another cell results from today's UEs lacking any intelligence in initial choice of cells based on UE capability.

UEs configured according to existing technologies also encounter difficulties relating to radio link failure (RLF) and out of sync (OOS) procedures implemented by UEs. For example, OOS procedures implemented by today's UEs first seek to acquire the system Radio Access Technology (RAT) on which the system lost event occurred. In doing so, the UE searches all bands and frequencies associated with, and provisioned for, the given RAT. This process is typically expensive in terms of power consumption. For example, scanning four LTE bands requires approximately thirteen seconds, which consumes considerable power. This process may also result in a poor user experience. For example, if a usable frequency is at an end of the LTE band scan (i.e., the fourth LTE band), the UE unnecessarily scans the first three LTE bands before arriving at the usable frequency, and the resulting delay experienced by users is undesirable. Additionally, if the UE fails to find the RAT, then the OOS procedure looks for a useful system defined within its geographic location, as may be specified according to the most recently used (MRU), preferred roaming list (PRL), or universal subscriber identity module (USIM). Again, the UE may experience delay and consume considerable power scanning for a usable frequency across the RATs. If all of these procedures fail to resume service, which usually occurs after extensive band scans, then the UE begins to look for roaming systems.

UEs configured according to existing technologies employ telescoping of OOS to conserve power. Such telescopic search algorithms iteratively increase the periodicity of subsequent search/sleep cycles. This solution works well in conserving power, but the penalty paid is delayed service capabilities to the end user. This trade-off between aggressive searches to restore service and telescoping to save power makes it extremely difficult, if not impossible to restore service quickly at low power consumption.

The techniques described herein advantageously address the aforementioned problems by storing configuration information, closed subscriber group (CSG) capability information, and/or evolved Multimedia Broadcast Multicast Service (eMBMS) capability information for a cell in a cell information database, which makes it possible to employ this stored information in various ways. For example, a UE may employ the stored information to determine an initial mutual information (Mi) hypothesis value for physical hybrid-automatic repeat request (HARQ) indicator channel (PHICH) group mapping of the cell. Additionally, a UE may employ location information for the cell in the cell information database to uniquely identify the cell. Also, a UE may employ the stored information during initial frequency scan at power up of the UE to prioritizing initial acquisition on a cell based on CSG capability and/or eMBMS capability of the cell even though it is has a lower signal strength at the UE than another cell not having CSG capability and/or eMBMS capability. Further, a UE may employ a stored sequence of information for a sequence of cells to predict an RLF or OOS event and, in response to the prediction, employ a previously obtained solution stored in association with the sequence to preferentially acquire another cell. Accordingly, these techniques may avoid loss of service and/or quickly acquire or restore service.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x serving a UE 120x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a smart phone, a handheld device, a laptop computer, a tablet, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz).

Figure 2:
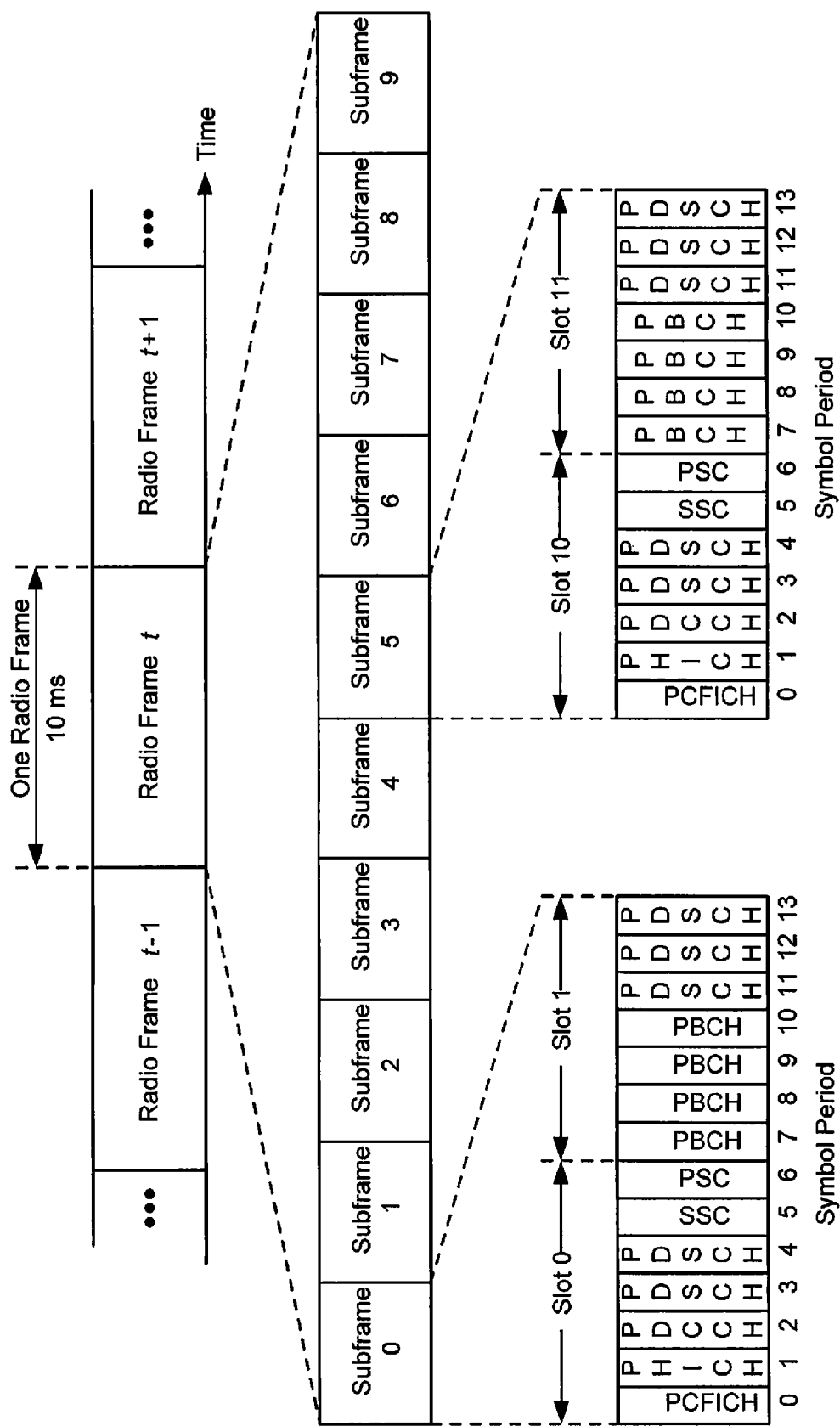
FIG. 2 is a block diagram illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
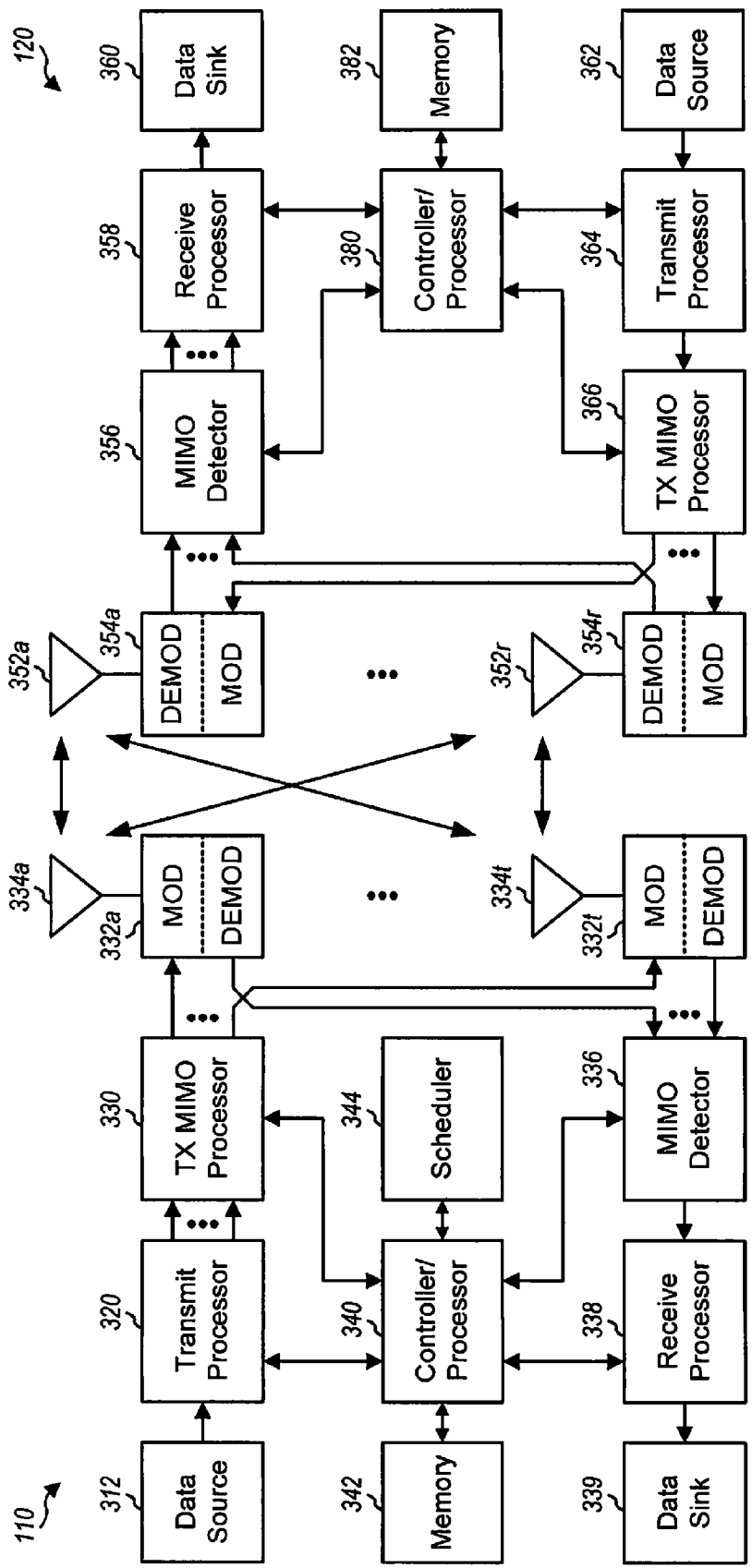
FIG. 3 is a block diagram illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a transmit MIMO processor 366 if applicable, further processed by the modulators 354a through 354r (e.g., for SC-FDM, etc.), and transmitted to the eNodeB 110. At the eNodeB 110, the uplink signals from the UE 120 may be received by the antennas 334, processed by the demodulators 332a through 332t, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the eNodeB 110 and the UE 120, respectively. A scheduler 344 may schedule UEs for data transmission on the downlink and/or uplink.

As mentioned above, the LTE standards have specified two frame structure types for downlink and uplink transmissions. For frame structure type 2 LTE TDD, the standards currently define seven different UL/DL configurations which have varying uplink and downlink subframe assignments that are broadcast in SIB1 by each LTE TDD network. For acquisition to a LTE TDD system, the UE, such as UE 120 (see FIG. 3), may be faced with the task of decoding SIB1. Master Information Block (MIB), SIB1, and SIB2 messages generally enable the UE to acquire LTE service on a network. However, to decode SIB1, the UE may decode the corresponding PDCCH, followed by the data on PDSCH. In order to perform the PDCCH decode, the UE may map the resource elements of the LTE system for the various physical channels (e.g., PHICH, PCFICH, and/or PDCCH).

As demonstrated below in Table 1, each LTE TDD UL/DL configuration may have a pre-defined Physical HARQ Indicator mapping based on a mutual information (Mi) hypothesis value that may be unique for each UL/DL configuration per subframe. However prior to decoding SIB1, the UE may be unaware of the Mi value corresponding to the LTE TDD system. Stated differently, the UL/DL configuration may be unknown until SIB1 is decoded by the RRC layer in the UE. In this case the UE may perform blind decoding using all of the possible Mi hypothesis values (i.e., 0, 1, and 2) in order to decode the PDCCH corresponding to SIB1 of the LTE TDD system. The UE may also allow multiple attempts with each Mi hypothesis in order to allow for any decode failures in bad channel conditions for a correct Mi value. As a result, long SIB1 decode times may often occur, resulting in large acquisition times for LTE TDD. These large acquisition times may be especially problematic when a UE is trying to report Cell Global Identity (CGI) for a neighbor cell within a specified time based on network configurations. Also, large acquisition times may be problematic in case of high-speed mobility scenarios where long delays in SIB1 decode may lead to failure to acquire LTE service due to rapid channel condition changes.

TABLE 1

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

In accordance with aspects of the present disclosure, a UE carries out a process to cache LTE TDD UL/DL configurations for known LTE TDD systems where the UE has successfully camped and/or successfully decoded the SIB1 message. For example, the UE may maintain a cell information database in memory that records one or more of the following SIB1 data for each LTE TDD cell:

Physical Cell Identity (PCI);
Frequency (EARFCN);
Bandwidth (BW);
UL/DL Configuration of TDD cell; and/or
Cell Global ID (CGI).

It is envisioned that the PID, EARFCN, and/or BW may also be employed to determine a configuration for a cell, and formulate an initial Mi hypothesis for PHICH group mapping of a cell. Therefore, these data are hereinafter referred to as configuration information for a cell.

In accordance with aspects of the present disclosure, the UE may employ the stored configuration information for a cell to determine an initial Mi hypothesis value to use in performing the PDCCH decode for SIB1 on LTE TDD cell. It is envisioned that, in order to minimize the time for the SIB decode for a cell, a UE may determine an initial MI hypothesis value for the cell whenever the configuration information for that cell is available. The UE may use the configuration information for the cell in the cell information database as a unique key for identifying this initial Mi hypothesis value. It is further envisioned that the UE may continuously update the cell information database with any changes to the SIB 1 information for LTE TDD cells known to the UE via SIB1 decoding during cell selection, SIB modification, or CGI reporting.

In some additional or alternative aspects, one or more additional keys may be included for determining the correct UL/DL configuration based on a cached cell information database. In these aspects, information may also be cached that relates to neighbor cells, and a location of a cell, such as determined global positioning system (GPS) coordinates, may be recorded when caching SIB1 data. Accordingly, in addition to PCI, EARFCN, BW, UL/DL Cfg, and/or CGI, a list of neighbor PCIs across all locations may be included to enable determination of unique PCI based on location. Thus, further advantages may be realized. For example, in the case that a PCI/EARCN/BW combination is reused at another location, the caching of neighbor PCIs and locations may allow further enhanced accuracy of the cell information database. In yet additional or alternative aspects, if a UE supports positioning reference signals (PRS) and/or observed time difference of arrival (OTDA), and if the eNB configures PRS/OTDA signaling for the cell, then the cell information database may also cache SIB/OTDA related signaling data to enable determination of location with improved accuracy.

The maximum time required for blind SIB1 decoding may be up to 240 ms. For example, if there may be up to four decoding attempts for each of the three Mi values, then the worst case scenario would require twelve decoding attempts. At 20 ms per decoding attempt, the total time required in the worst case scenario is 240 ms. However, with the process disclosed herein, it is envisioned that the maximum SIB1 decode time may be reduced from a potential maximum of 240 ms to a maximum of 80 ms or less. This reduced maximum SIB decoding time may provide several benefits. For example, the reduced maximum SIB decoding time for CGI reporting may enable the UE to use the remaining CDRX OFF durations for sleep and power conservation. Similar benefits may be observed in public land mobile network (PLMN) search scenarios. Also, the reduced maximum SIB decoding time may prove useful or necessary for CSG scenarios in order for TDD cells to be able to successfully decode SIB1 of neighbor CSG cells within an autonomous gap duration of 160 ms with highest probability. Also, in mobility cases, such as reselection and redirection, a UE may decode SIB1 and potentially acquire any previously known LTE TDD system significantly faster when compared with blind SIB1 decoding. In medium to high mobility scenarios, this faster acquisition may avoid a delay that could lead to a cell being unsuitable for reselection, and thus avoid a loss of service.

As also mentioned above, in initial frequency scan at power up of the UE, today's UEs prioritize the highest energy cell as a candidate for acquisition. However, the UE may then need to reselect to another cell having desired capabilities, such as closed subscriber group (CSG) capability and/or evolved Multimedia Broadcast Multicast Service (eMBMS) capability. This potential need to reselect to another cell results from today's UEs lacking any intelligence in choice of cells based on UE capability during initial frequency scan at power up of the UE.

In some aspects according to the present disclosure, the above issues may addressed using the cell info database. For example, during cell selection and/or reselection, the CSG and/or eMBMS capability of cells may be readily determined and used for preferential cell selection based on cell capability. The UE may store and update this cell capability information in the cell information database for later use during initial frequency scan at power up of the UE. Using this stored cell capability information, the UE may preferentially select a weaker cell, during initial frequency scan at power up of the UE, based on the desired capabilities of the weaker cell. Accordingly, the need to reselect to a weaker cell having the desired capabilities may be avoided.

Avoiding the need to reselect to a weaker cell may be significant. For example, if a UE that needs to acquire eMBMS services selects a strongest cell lacking eMBMS capability, then the UE will not be able to acquire eMBMS services until it moves to RRC idle mode, at which point the UE may prioritize reselecting to a weaker cell having eMBMS capability. Based on the time required for a UE to move to RRC idle mode, the delay incurred may be up to one minute. Therefore, storing cell capability information and using the stored capability information, during initial frequency scan at power up of the UE, to preferentially select a cell based on cell capability may avoid significant delay in the UE obtaining desired services.

Figure 4:
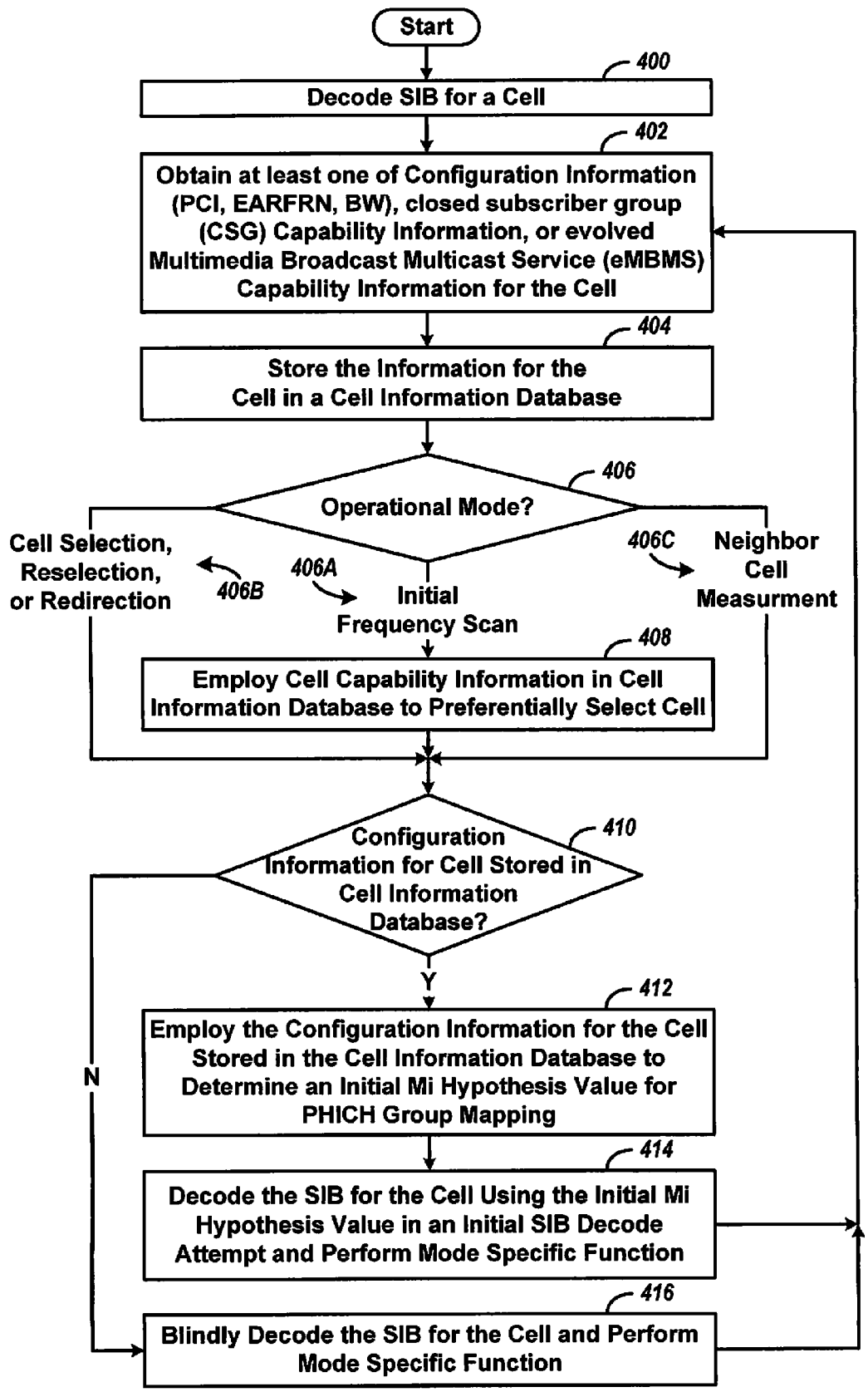
FIG. 4 is a block diagram illustrating example blocks of a wireless communication process carried out by a UE according to an aspect of the present disclosure.

FIG. 4 illustrates example blocks of a process performed by a UE according to an aspect of the present disclosure. Beginning at block 400, the UE may decode a SIB message for a particular cell. For example, the UE may decode a SIB message of a serving cell, a target cell, or a neighbor cell at block 400. Additionally, it is envisioned that the UE may, at block 400, decode the SIB message of the cell by blind decoding. For blind decoding, it is envisioned that the UE may attempt four SIB decodes for each Mi hypothesis value in succession. Implementing four attempts per Mi hypothesis value may ensure that HARQ combining helps in cases where the Mi used is correct, but the UE fails to decode SIB1 due to poor channel conditions. Another possible UE implementation involving a more complex hardware design is to perform all possible Mi hypothesis based decodes on each subframe of the neighbor cell until SIB1 is acquired. Also, it is envisioned that the UE may, at block 400, decode the SIB message of the cell using an initial Mi hypothesis value determined from information received in or with a handover command. Further, it is envisioned that the UE may, at block 400, decode the SIB message of the cell using an initial Mi hypothesis value determined from configuration information for the cell stored in a cell information database, as detailed below. Processing may proceed from block 400 to block 402.

At block 402, the UE may obtain configuration information, CSG capability information, and/or eMBMS capability information for the cell. For example, the UE may obtain the configuration information for the cell from the SIB decoded at block 400. In this case, it is envisioned that the UE may obtain a PID of the cell, an EARFRN of the cell, a BW of the cell and/or additional information at block 402, such as UL/DL configuration, PLMN ID, and/or CGI. Additionally, it is envisioned the that UE may obtain CSG capability information for the cell and/or eMBMS capability information for the cell. Processing may proceed from block 402 to block 404.

At block 404, the UE may store the information for the cell in a cell information database. For example, the UE may create or update a cell information database entry for the cell, and record the PID, EARFN, BW, UL/DL configuration, PLMN ID, CGI, CSG capability information, and/or eMBMS capability information in the cell information database entry for the cell. It is envisioned that, at block 404, a processor of the UE may access memory of the UE and read/write data in memory locations designated for the database entry for the cell.

It is additionally envisioned that, at block 404, the UE may include one or more additional keys in the cell information database for determining the correct UL/DL configuration based on a cached cell information database. In these aspects, the UE may, at block 404, cache information that relates to neighbor cells, and a location of a cell may be recorded by the UE, at block 404, when caching SIB1 data. Accordingly, in addition to PCI, EARFCN, BW, UL/DL Cfg, and/or CGI, the UE may create, edit, and/or update a list of neighbor PCIs across all locations to enable determination of unique PCI based on location. Also, if the UE supports positioning reference signals (PRS) and/or observed time difference of arrival (UEDA), and if the eNB configures PRS/OTDA signaling for the cell, then the UE may, at block 404, cache PRS/OTDA related signaling data in the cell information database to enable determination of location with improved accuracy. Processing may proceed from block 404 to block 406.

At block 406, the UE may make a determination of an operational mode in which to operate. For example, the UE may determine, at block 406, to perform an initial frequency scan at power up of the UE, as shown at 406A. Alternatively, the UE may determine to perform cell selection, reselection, or redirection as shown at 406B. As another alternative, the UE may determine, in response to a request to perform CGI reporting and/or PLMN search, to perform neighbor cell measurement as shown at 406C, in which case processing may proceed to block 410.

If the UE determines, at block 406, to perform initial frequency scan 406A at power up of the UE, then the UE may, at block 408, employ any cell capability information stored in the cell information database to determine which, if any, suitable cells have desired capabilities. For example, at block 408, a UE having eMBMS capability may preferentially select a weaker cell having eMBMS capability over a stronger cell that does not have eMBMS capability. Alternatively, or additionally, a UE may preferentially select a weaker cell having CSC capability over a stronger cell that does not have CSG capability. Processing may proceed from block 408 to block 410.

If the UE determines, at block 406, to perform cell selection, reselection, or redirection 406B, then the UE may also prioritize selection and/or reselection to a cell having desired capabilities. During this process, the UE may determine the capabilities of neighbor cells, such as CSG capabilities and/or eMBMS capabilities. It is envisioned that the UE may update the cell capability information for the database entries for those cells in the cell information database. Alternatively, it is envisioned that the UE may queue the cell capability information to be used in updating the database entries for those cells in the cell information database upon return to an earlier point in the process, as described below. Processing may also proceed to block 410.

At block 410, the UE may make a determination whether configuration information for the cell is already stored in the cell information database. For example, the UE may employ the PCI/EARCN/BW combination of the cell as a unique key to access stored UL/DL configuration data, a previously successful Mi hypothesis value, or other information recorded, at block 404, for the cell. Additionally or alternatively, the UE may, at block 410, employ one or more additional keys included for determining the correct UL/DL configuration based on a cached cell information database. For example, the UE may access cached information that relates to neighbor cells, such as a recorded location of a cell. Accordingly, in addition to PCI, EARFCN, BW, UL/DL Cfg, and/or CGI, the UE may access a list of neighbor PCIs across all locations to enable determination of unique PCI based on location. Additionally, it is envisioned that the UE may, at block 410, access cached PRS/OTDA related signaling data to enable determination of location with improved accuracy. If the UE determines, at block 410, that configuration information for the cell is available in the cell information database, then the UE may respond by proceeding from block 410 to block 412. However, if the UE determines, at block 410, that no configuration information is available for the cell in the cell information database, then processing may proceed to block 416.

At block 412, the UE may employ configuration information for the cell stored in the cell information database to determine an initial Mi hypothesis value for PHICH group mapping. For example, it is envisioned that the UE may read a PID, EARFCN, and/or BW for the cell from the cell information database, and employ the PID, EARFCN, and/or BW to determine the initial Mi hypothesis value. Processing may proceed from block 412 to block 414.

At block 414, the UE may decode the SIB message for the cell using the initial Mi hypothesis value in an initial SIB decode attempt. In order to perform this decode, the UE may tune to the frequency of the cell specified by the network configuration and perform MIB and SIB message decoding within a specified CDRX OFF duration that may be as small as 160 ms. If the SIB message decoding attempt is unsuccessful, then the UE may, at block 414, reattempt the initial decode attempt with the initial Mi hypothesis value. For example, it is envisioned that the UE may attempt up to four SIB message decodes for the initial Mi hypothesis value. Implementing up to four attempts for the initial Mi hypothesis value may ensure that HARQ combining helps in cases where the initial Mi hypothesis value is correct, but the UE fails to decode SIB1 due to poor channel conditions. If the SIB message decoding continues to be unsuccessful after a predetermined maximum number of attempts, then the UE may determine that the initial Mi hypothesis value may be incorrect, presumably due to the UL/DL configuration of the cell having changed. Upon determining, at block 414, that the initial Mi hypothesis value may be incorrect, the UE may respond by performing blind decoding of the SIB for the cell. It is envisioned that this blind decoding attempt may employ multiple attempts per MI hypothesis value, but avoid further reattempts using the initial Mi hypothesis value that was determined to be incorrect.

Upon successfully decoding the SIB message of the neighbor cell at block 414, the UE may perform one or more mode specific functions at block 414. For example, in the initial frequency scan and selection, reselection, or redirection modes of operation, the UE may initiate, request, participate in, and/or complete handover to the cell. Alternatively, in the neighbor cell measurement mode of operation, the UE may report the CGI or PLMN ID of the neighbor cell, according to the request received at block 406. Processing may proceed from block 414 to an earlier point in the process, such as block 402, thereby causing the configuration information for the neighbor cell in the cell information database to be updated.

At block 416, the UE may blindly decode the SIB message for the cell. For example, the blind decoding of the PDCCH of the cell may be based on successive assumptions of Mi value of 0, 1, and 2. It is envisioned that the UE may attempt four SIB message decodes for each Mi hypothesis value in succession. Implementing four attempts per Mi hypothesis value may ensure that HARQ combining helps in cases where the Mi used is correct, but the UE fails to decode SIB1 due to poor channel conditions. Another possible UE implementation involving a more complex hardware design is to perform all possible Mi hypothesis based decodes on each subframe of the neighbor cell until SIB1 is acquired.

Upon successfully blindly decoding the SIB message of the neighbor cell at block 416, the UE may perform one or more mode specific functions at block 416. For example, in the initial frequency scan and selection, reselection, or redirection modes of operation, the UE may initiate, request, participate in, and/or complete handover to the cell. Alternatively, in the neighbor cell measurement mode of operation, the UE may report the CGI or PLMN ID of the neighbor cell, according to the request received at block 406. Processing may proceed from block 416 to an earlier point in the process, such as block 402, thereby causing creation of a data entry in the cell information database for the configuration information for the neighbor cell.

As mentioned above UEs configured according to existing technologies encounter difficulties relating to out of sync (OOS) procedures implemented by UEs. For example, OOS procedures implemented by some UEs first seek to acquire the system Radio Access Technology (RAT) on which the system lost event occurred. In doing so, the UE searches all bands and frequencies associated with, and provisioned for, the given RAT. This process is typically expensive in terms of power consumption. For example, scanning four LTE bands may require approximately thirteen seconds, which consumes considerable power. This process may also result in a poor user experience. For example, if a usable frequency is at an end of the LTE band scan (i.e., the fourth LTE band), the UE unnecessarily scans the first three LTE bands before arriving at the usable frequency, and the resulting delay experienced by users is undesirable. Additionally, if the UE fails to find the RAT, then the OOS procedure looks for a useful system defined within its geographic location, as may be specified according to the most recently used (MRU), preferred roaming list (PRL), or universal subscriber identity module (USIM). Again, the UE may experience delay and consume considerable power scanning for a usable frequency across the RATs. If all of these procedures fail to resume service, which usually occurs after extensive band scans, then the UE begins to look for roaming systems.

As previously noted, UEs configured according to existing technologies also employ telescoping of OOS to conserve power. Such telescopic search algorithms iteratively increase the periodicity of subsequent search/sleep cycles. This solution effectively conserves power, but the penalty paid is delayed service capabilities to the end user. This trade-off between aggressive searches to restore service and telescoping to save power makes it extremely difficult, if not impossible, to restore service quickly at low power consumption.

In addition to the sub-optimal behavior of the UE OOS algorithm described above, the current algorithms also have limitations in that they do not have any notion or information about the UE geographic location or the UE's relative location (relative to NW deployment and cells). It can be observed as well that many (not all) system loss events occur based on a pattern. For example, most people have a pattern defined to their regular lives, such as traveling the same route between home and work place. Additionally, even in indoor scenarios, such as parking structures, people tend to park in the same or similar location and walk the same path to and from their office location. If the UE experiences a system loss event in such a route/location, it is expected with a high probability that it will encounter a system loss event in a proximate or same location the next time the UE is in the same vicinity along the same route. Current OOS algorithms do not take advantage of such repeated user behavior. In addition, none of the current OOS algorithms or any of the PHY/MAC layer algorithms can predict the occurrence of a RLF or OOS event, which would be useful in the repetitive scenarios described above. It is envisioned that, given the repetitive patterns of user behavior previously described, one may effectively predict a LTE RLF or OOS event and take pro-active measures to re-acquire the system or look for alternative systems.

Some aspects of the present disclosure are directed to improving power conservation by achieving shorter search periods, and searching when the RF/modem chip is already on and in use. These aspects are also directed at achieving a better user experience by responding more quickly to a RLF or OOS event. As explained in detail below, these advantageous technical effects may be achieved by predicting RLF or OOS events and employing pre-emptive strategies.

In accordance with aspects of the present disclosure, a UE may learn about possible OOS and RLF events and react accordingly. It is envisioned that a reactive response may entail learning from past OOS/RLF events by recording and using a solution (PCI-PLMN-earFCN acquired) obtained for each event in case a similar event is observed. It is also envisioned that a proactive response may entail predicting the RLF/OOS based on previous user experience and reacting accordingly by scheduling service searches when LTE is still in RRC connected state and predicted to have a RLF or OOS event. The searches scheduled may also utilize the solutions recorded at the occurrence of a previously solved RLF or OOS event, as recorded by the UE. Alternatively or additionally, the UE may follow current OOS procedures as described above. This alternative remains advantageous because the UE is enabled to proactively search for an alternative system to be made available immediately upon occurrence of a RLF or OOS event. It is envisioned that the UE may, upon prediction of a RLF or OOS event, first attempt to employ a previous solution recorded in memory and, in response to the previous solution proving to be unavailable, follow current OOS procedures.

The RLF or OOS prediction mechanism disclosed herein may capture the historical and geographical/relative location information to aid in RLF or OOS prediction. This data may be captured, for example, in a data structure called a RLF database (RLF DB), which may be implemented as part of the cell information database described above with reference to FIG. 4. It is envisioned that the RLF DB may store a triplet of information of the LTE cell on which the RLF occurred, and this triplet may uniquely identify the LTE cell. Alternatively or additionally, the cell information database described above with reference to FIG. 4 may store triplets of information to uniquely identify each cell, and elements of the cell information database may be referenced as objects in a triplet sequence recorded by the RLF DB. An example triplet may include the earFCN, PLMN ID, and PCI of the cell. Accordingly, the RLF DB may be designed based on the cell information database described above with reference to FIG. 4. Alternatively or additionally, the RLF database may be designed based on the current acquisition database (ACQ DB) structure provided below in TABLE 2, or it may be implemented as an enhancement of the ACQ DB to include new entries.

TABLE 2

Downlink earFCN
Physical Cell ID
Band
  Bandwidth
  PLMN list from SIB1

TABLE 2-continued

PLMN selected for full-service camping,
First PLMN in SIB1 list for limited-service camping
PLMN index in the SIB1 PLMN list of the PLMN selected for full-
service camping,
0 for limited-service camping
Index of SIB1 in the SIB database
Global Cell ID
Tracking Area update
Barring Status
Timestamp
TDD/FDD information For LTE RLF or OOS prediction, it is envisioned that two data sets of information may be employed. For example, upon occurrence of a LIE RLF or OOS event, the UE may record the LIE cell where the LIE RLF occurred by recording the triplet for the LIE cell in the RLF DB. The UE may additionally record the two immediately previous LIE or non-LTE cells on which the UE was camped prior to the LIE cell on which the RLF occurred. The UE may also record the order/sequence of these three cells. Thereafter, observance, by the UE, of three such triplets (each corresponding to one LIE cell) of information occurring in the same order may be the first condition for RLF or OOS prediction. Accordingly, the UE may correlate the sequence of three LIE cells in a given order to ascertain the vicinity in the which the RLF previously occurred. It is also envisioned that the UE may record the radio signal receive power (RSRP) of the LIE cell upon occurrence of a RLF or OOS event, and this power level may be employed as a threshold for predicting a RLF or OOS event on that cell. For example, if the current LIE cell and the previous two LTE cells match an entry in the RLF database, and if the RSRP of the current LIE cell falls below or approaches, for a predetermined period of time, an RSRP recorded for that RLF DB entry, then the UE may predict a RLF or OOS event. Alternatively, a predetermined RSRP threshold may be used to trigger the RLF or OSS prediction. Alternatively or additionally, the UE may predict a RLF or OOS event upon initiation of n310 events, where n310 is a parameter that indicates the number of 200 ms intervals when the UE is unable to successfully decode the PDCCH due to low RSRP detected. Stated differently, this parameter indicates the number of times in which the UE cannot successfully decode twenty consecutive frames in the downlink.

In response to prediction of LTE RLF or OOS event, the UE may acquire lock of the secondary RF receiver from LTE. Acquiring lock of the secondary RF receiver may be performed, for example, by UEs having dual receiver features, such as simultaneous LTE (SLTE). It is envisioned that LTE giving up lock of the diversity receiver may cause a detrimental change in link budget, but the RLF or OOS prediction mechanism may be configured to predict a RLF or OOS event in situations in which the predicted RLF or OOS event is likely to occur even in the case where LTE has lock of both receivers. This prediction reliability may be achieved, in part, by observing the order of the triplets in the RLF DB entry, which establishes the direction of travel of the UE.

Once the RF lock is released by LTE, normal OOS procedures may be followed or the optimized RLF DB can be used to look for the solution which was found the last time the UE encountered a RLF in the same vicinity as established by the LTE cell triplet. As previously mentioned, this capability may be achieved due to features, such as SLTE, in which two RATs may operate simultaneously on two different RF chains.

The RLF DB may contain information about previous OOS/RLF events. This information may be used to limit the search space for the acquisition algorithm when similar events reoccur. Each entry in the RLF DB may be identified by a unique serving triplet (i.e., earFCN, PLMN ID, PCI). The serving triplet may be used to identify similar RLF/OOS events. The number of entries in the RLF database may be limited to a maximum, such as ten entries. It is envisioned that the RLF DB may contain information regarding OOS/RLF events, such as OOS/RLF event frequency, and last occurrence of an OOS/RLF event. It is also envisioned that the RLF DB may contain information regarding solutions that were found by the UE in response to the RLF/OOS events, such as information identifying the solution cell, time spent in OOS before the solution is found, and a solution success rate. TABLE 3 provides an example of a RLF DB according to some aspects.

TABLE 3

Downlink earFCN
PLMN
Physical Cell ID
  Tracking Area code
  Bandwidth
  Global Cell ID
  TDD/FDD information
  Barring Status
  Mobility Info (Low/Med/High)
  Occurrence_Count
  Last_Occurrence
  OOS_Solution [ . . . ] Similar To Acq Db entries plus RLFDB control parameters
    Downlink earFCN
    PLMN ID
    Physical cell ID
    Band
    Bandwidth
    Global cell ID
    Tracking area code
    . . . Other Acq DB Elements . . .
    Cell barring status
    Time_in_OOS
    Success Count and Last Success
Previous Cells Triplet Sequence RLF DB management may be carried out by the UE. For example, the UE may perform operations relating to RLF DB storage, sharing, and maintenance. The UE may additionally perform operations relating to detecting RLF/OOS events, learning about solutions to these events, matching the current OOS/RLF event to the RLF database elements, and sharing this information with the non-access stratum (NAS) for proper reaction. In managing the RLF database, the UE may further perform entry inclusion, solution inclusion, entry update, solution update, entry removal, and solution removal operations as further described below with respect to FIG. 5.

Figure 5:
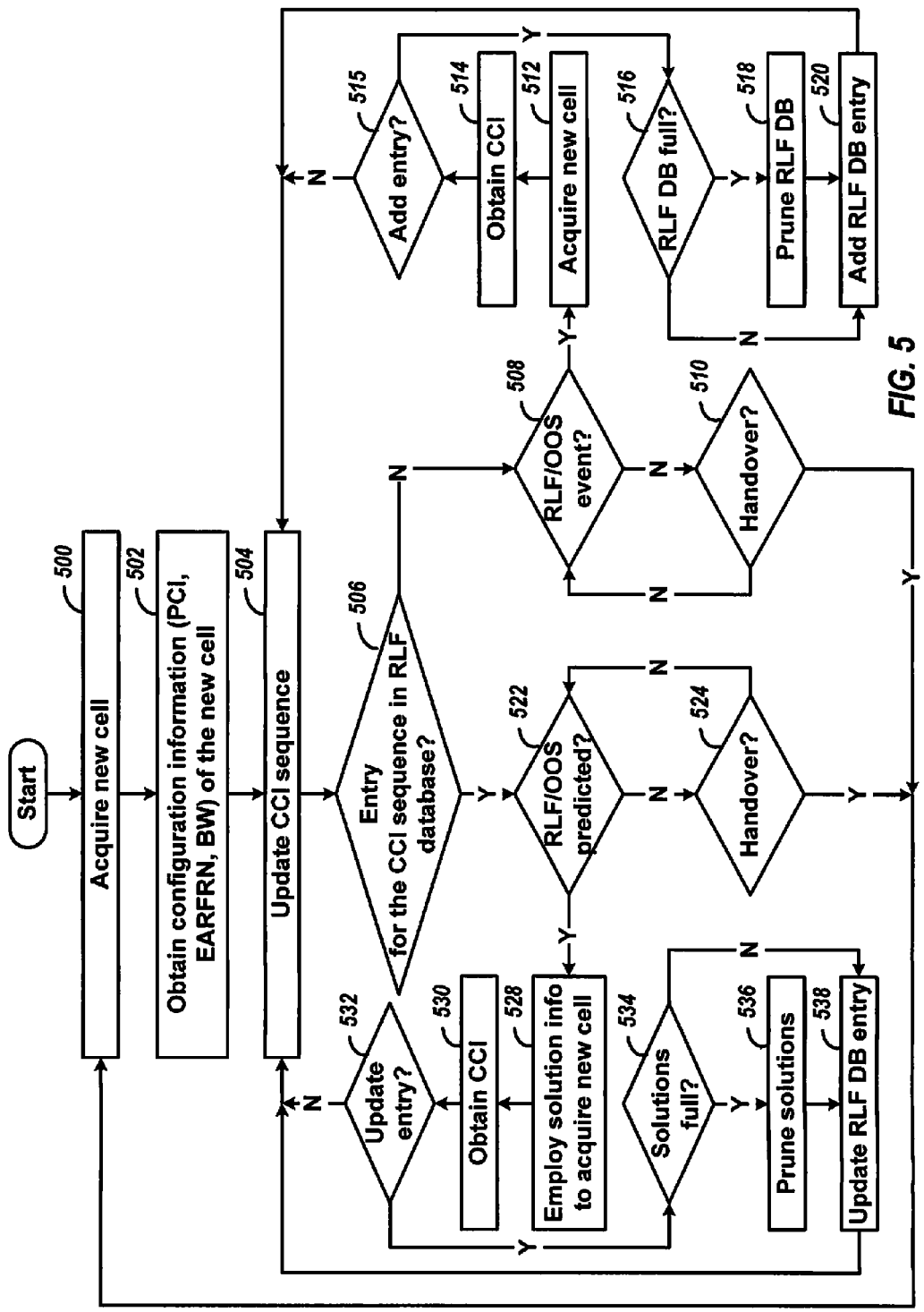
FIG. 5 is a block diagram illustrating example blocks of a wireless communication process carried out by a UE according to an aspect of the present disclosure.

Referring now to FIG. 5, a wireless communication process carried out by the UE with respect to RLF/OOS is described in further detail. At block 500, the UE may acquire a new cell. Acquiring the new cell at block 500 may occur as a result of initialization, handover, selection, or reselection procedures, as will be readily understood by one skilled in the art. It is envisioned that the operations carried out at block 500 may include the procedures described above with respect to FIG. 4. Processing may proceed from block 500 to block 502.

At block 502, the UE may obtain configuration information of the new cell. For example, the UE may obtain the configuration information for the cell by decoding one or more SIBs as previously described. It is envisioned that the UE may obtain a PID of the cell, an earFCN of the cell, and a BW of the cell at block 502. It is additionally envisioned that UE may concurrently obtain UL/DL configuration, PLMN ID, CGI, CSG capability information, and/or eMBMS capability information, and store and use these types of information as previously described with respect to FIG. 4. Processing may proceed from block 502 to block 504.

At block 504, the UE may update a cell configuration information (CCI) sequence that it stores in memory in order to track a sequence of the three most recent cells. It is envisioned that the UE may track CCI sequences of other lengths, such as two cells or four or more cells. A CCI sequence of three cells is employed for purposes of illustration. Updating the CCI sequence may entail, for example, populating a data structure in UE memory with the CCI of the current cell ($CCI_1$), the CCI of the previous cell ($CCI_2$), and the CCI of the cell before the previous cell ($CCI_3$). For example, if the UE moves from the cell corresponding to $CCI_2$ to the cell corresponding to $CCI_1$, then the data structure may be updated from $CCI_2 \leftarrow CCI_3 \leftarrow CCI_4$ to $CCI_1 \leftarrow CCI_2 \leftarrow CCI_3$, where $CCI_4$ is the cell that preceded $CCI_3$, and the directions of the pointers between the elements of the data structure indicate an order in which the UE acquired the cells that are uniquely identified by their respective CCIs. Processing may proceed form block 504 to block 506.

At block 506, the UE may determine whether the current CCI sequence stored in memory matches a CCI sequence of an entry stored in the RLF database. If the UE determines, at block 506, that the CCI sequence stored in memory does not match a CCI sequence of an entry stored in the RLF database, then processing may proceed to block 508. However, if the UE determines, at block 506, that the CCI sequence stored in memory does match a CCI sequence of an entry stored in the RLF database, then processing may proceed to block 522.

At block 508, the UE may determine whether a RLF or OOS event has occurred in a manner that will be readily understood by one skilled in the art. If the UE determines, at block 508, that a RLF or OOS event has not occurred, then processing may proceed to block 510. However, if the UE determines, at block 508, that a RLF or OOS event has occurred, then processing may proceed to block 512.

At block 510, the UE may determine whether a handover is indicated in a manner that will be readily understood by one skilled in the art. If the UP determines, at block 510, that a handover is indicated, then processing may return to block 500 for acquisition of a new cell, as previously described. However, if the UP determines, at block 510, that a handover is not indicated, then processing may return to block 508 for further monitoring for occurrence of a RLF or OOS event.

At block 512, the UP may respond to a RLF or OOS event by acquiring a new cell in a manner that will be readily understood by one skilled in the art. It is envisioned that the operations carried out at block 512 may include the procedures described above with respect to FIG. 4. Processing may proceed from block 512 to block 514.

At block 514, the UE may obtain the CCI of the new cell in the manner previously described with respect to block 502. Processing may proceed from block 514 to block 515.

At block 515, the UP may determine, in response to the RLF, whether to add an entry to the RLF database, In making this determination, it is envisioned that the UE may observe one or more conditions relating to inclusion of RLF database entries and/or solutions associated with those entries. For example, as a RLF DB entry inclusion condition, the UP may require that RLF/OOS declared on a serving cell does not have a matching serving triplet (i.e., PCI, earFCN, PLMN) sequence in the RLF DB. Another condition required by the UP for entry inclusion may be a condition that the time spent in OOS does not exceed a predefined upper bound (e.g., five minutes). Additionally, as a RLF DB solution inclusion condition, the UP may require that the serving triplet sequence corresponding to the current triplet sequence exist in the table, and that the radio resource control (RRC) declares OOS/RLF while camped on the serving cell. Another condition required by the UE for solution inclusion may be a condition that the solution passes the following tests: successful acquisition of a new cell; successful read of the mandatory SIBs (i.e., MIB, SIB1, and SIB2) on the new cell; that the new cell is not barred; and that a time spent in OOS does not exceed the predefined upper bound. A further condition required by the UP for solution inclusion may be that the solution triplet (i.e., PCI, earFCN, PLMN) of the new cell does not already exist in the RLF DB. If the UE determines, at block 515, not to add an entry to the RUE DB, then processing may return to block 504. However, if the UP determines, at block 515, to add an entry to the RLF DB, then processing may proceed to block 516.

At block 516, the UE may determine whether to remove an entry from the RUE DB. In determining whether to remove an entry from the RLF DB, at block 516, it is envisioned that the UP may observe one or more conditions relating to removal of RLF database entries and/or solutions associated with those entries. For example, as a RLF DB entry removal condition, the UE may require that the last entry of the RLF DB be removed whenever a new entry should be added and the list is at its maximum length. It is envisioned that the last entry may be the entry with the lowest Sort_score, calculated as follows:

Sort_score=Occurrence_Count/(Time since Last_Occurrence)+1/NΣSuccess_Count/(Time since Last_Success)

where N is the number of elements in the solution list, Occurrence_Count is a number of RLF/OSS occurrences, Last_Occurrence is a date and time of a most recent RLF/OSS occurrence, Success_Count is a number of successes, and Last_Success is a date and time of a most recent success. If it is determined, at block 516, to remove an entry from the RLF DB, then processing may proceed to block 518. However, if it is determined, at block 516, not to remove an entry from the RLF DB, then processing may proceed to block 520.

At block 518, the UE may prune the RLF DB by removing the entry having the lowest sort score. Processing may proceed from block 518 to block 520.

At block 520, the UE may add a RLF DB entry indexed by the CCI sequence currently stored in memory of the UE. It is envisioned that the CCI of the newly acquired cell may be stored in the entry as a solution for the RLF in response to the determining, at block 515, that the conditions for adding the solution are met. Processing may return from block 520 to block 504.

At block 522, the UE may make a determination whether a RLF or OOS event n is predicted, as previously described. For example, if the RSRP of the current LTE cell falls below or approaches, for a predetermined period of time, an RSRP recorded for that RLF DB entry, then the UE may predict a RLF or OOS event. Alternatively, a predetermined RSRP threshold may be used to trigger the RLF or OOS event prediction. Alternatively or additionally, the UE may predict a RLF or OOS event upon initiation of n310 events, as previously described. If the UE determines, at block 522, that a RLF or OOS event is predicted, then processing may proceed to block 528. However, if the UE determines, at block 522, that a RLF or OOS event is not predicted, then processing may proceed to block 524.

At block 524, the UE may determine whether a handover is indicated in a manner that will be readily understood by one skilled in the art. If the UE determines, at block 524, that a handover is indicated, then processing may return to block 500 for acquisition of a new cell, as previously described. However, if the UE determines, at block 524, that a handover is not indicated, then processing may return to block 522 to monitor for prediction of a RLF or OOS event.

At block 528, the UE may acquire a new cell in the manner previously described. For example, the UE may acquire lock of the secondary RF receiver from LTE. Once the RF lock is released by LTE, normal OOS procedures may be followed or the optimized RLF DB can be used to look for the solution which was found the last time the UE encountered a RLF in the same vicinity as established by the LTE cell triplet. It is envisioned that, if multiple solutions exist for a RLF DB entry, the UE may selectively employ the most successful solution. Alternatively or additionally, the UE may employ procedures described above with respect to FIG. 4 in order to selectively employ a solution that best meets the current needs of the UE regarding, for example, CSG capability and/or eMBMS capability. It is also envisioned that the operations carried out at block 528 may include the procedures described above with respect to FIG. 4. Processing may proceed from block 528 to block 530.

At block 530, the UE may obtain the CCI of the new cell in the manner previously described with respect to blocks 502 and 514. Processing may proceed from block 530 to block 532.

At block 532, the UE may determine, in response to the RLF or OOS event prediction, whether to update an entry of the RLF database in making this determination, it is envisioned that the UE may observe one or more conditions relating to update of RLF database entries and/or solutions associated with those entries. For example, as a RLF DB entry update condition, the LTE may require that RLF/OOS declared on a serving cell has a matching serving triplet (i.e., PCI, earFCN, PLMN) sequence in the RLF DB. If this condition is met, then the UE may update information relating to mobility, a number of RLF/OSS occurrences (Occurrence_Count), and/or a date and time of a most recent RLF/OSS occurrence (Last_Occurrence). It is additionally envisioned that the UE may add a solution to the solutions list for that entry. Additionally, as a RLF DB solution update condition, the UE may require that as successful solution be found alter declaring OOS/REF while camped on a serving cell having a serving triplet that matches a current triplet sequence recorded in the RLF DB, and that the solution triplet (i.e., PCI earFCN, PLMN) exists as a solution in the corresponding serving entry in the RLF DB. The LTE may also require, as a solution update condition, that the solution passes the following tests: successful acquisition of a new cell; successful read of the mandatory SIBs (i.e., MIB, SIB1, and SIB2) on the new cell; that the new cell is not barred; and that a time spent in OOS does not exceed the predefined upper bound. If these solution update conditions are met, then the UE may decide to update information relating to time spent in OOS, a number of success occurrences (Success_Count), and/or a date and time of a most recent success occurrence (Last_Success). Processing may proceed from block 532 to block 534.

At block 534, the UE may determine whether to remove a solution from a solutions list of the entry to be updated. For example, it is envisioned that, as a solution removal condition, the UE may require that the last entry in the solution list of a RLF DB entry be removed whenever a new solution should be added to the solution list and the list is at its maximum length. It is envisioned that the last entry may be the entry with the lowest Solution_score, calculated as follows:

Solution score=Success Count/(Time since Last_Success),

Processing may proceed from block 534 to block 536.

At block 536, the UE may prune the solutions list of the RLF DB entry by removing the solution having the lowest Solution_score. Processing may proceed from block 536 to block 538.

At block 538, the UE may update the RLF DB entry. For example, the UE may add a solution to the solutions list of the RLF DB entry. Alternatively or additionally, the UE may update information relating to time spent in OOS, a number of success occurrences (Success_Count), and/or a date and time of a most recent success occurrence (Last_Success).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one" of indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   obtaining, by a user equipment (UE), information for a cell, wherein the obtained information includes configuration information comprising a physical cell identity (PCI), a frequency (earFCN), and a bandwidth for the cell;
   storing, by the UE, the obtained information for the cell in a cell information database;
   employing, by the UE, the configuration information for the cell in the cell information database to determine an initial mutual information (Mi) hypothesis value for physical hybrid-automatic repeat request (HARQ) indicator channel (PHICH) group mapping of the cell; and
   performing, by the UE using the initial Mi hypothesis value, a Physical Downlink Control Channel (PDCCH) decode for a system information block (SIB) on the cell, wherein the SIB is SIB1.

2. The method of claim 1, wherein the configuration information further comprises a location of the cell, and wherein storing the obtained information for the cell in the cell information database includes storing the location of the cell in the cell information database, including caching data relating to at least one of positioning reference signals (PRS), observed time difference of arrival (OTDA), or determined global positioning system (GPS) coordinates, the method further comprising:
   employing, by the UE, the configuration information for the cell in the cell information database, including the location information, to uniquely identify the cell.

3. The method of claim 1, wherein the obtained information for the cell further includes closed subscriber group (CSG) capability information for the cell, and wherein storing the obtained information for the cell in the cell information database includes storing the CSG capability information, the method further comprising:
   employing, during initial frequency scan at power up of the UE, the cell information database to determine that the cell has CSG capability, and that another cell does not have CSG capability; and
   prioritizing initial acquisition on the cell based on the CSG capability of the cell even though it has a lower signal strength at the UE than the other cell not having CSG capability.

4. The method of claim 1, wherein the obtained information for the cell further includes evolved Multimedia Broadcast Multicast Service (eMBMS) capability information for the cell, and wherein storing the obtained information for the cell in the cell information database includes storing the eMBMS capability information, the method further comprising:
   employing, during initial frequency scan at power up of the UE, the cell information database to determine that the cell has eMBMS capability, and that another cell does not have eMBMS capability; and
   prioritizing initial acquisition on the cell based on the eMBMS capability of the cell even though it has a lower signal strength at the UE than the other cell not having eMBMS capability.

5. The method of claim 1, wherein the storing includes recording, in response to at least one of a radio link failure (RLF) or out of synch (OOS) event on the cell, a sequence of cell configuration information (CCI) of the cell and one or more CCIs of one or more previous cells previously acquired by the UE, wherein the configuration information includes the PCI, public land radio network (PLMN), and the earFCN of the cell, the method further comprising:
   determining a match between a current CCI sequence and one or more CCI sequences stored in the cell information database; and
   predicting, at least partly in response to the determining the match, at least one of a RLF or OOS event.

6. The method of claim 5, wherein the storing further includes recording, at least partly in response to successful acquisition of another cell following at least one of occurrence or prediction of the RLF or OOS event, a CCI of the other cell as a solution associated with the sequence of CCI, the method further comprising:
   employing the solution associated with the sequence of CCI, at least partly in response to the predicting the RLF or OOS event, to preferentially acquire the other cell.

7. An apparatus for wireless communication, the apparatus comprising:
   means for obtaining, by a user equipment (UE), information for a cell, wherein the obtained information includes configuration information comprising a physical cell identity (PCI), a frequency (earFCN), and a bandwidth for the cell;
   means for storing, by the UE, the obtained information for the cell in a cell information database;
   means for employing, by the UE, the configuration information for the cell in the cell information database to determine an initial mutual information (Mi) hypothesis value for physical hybrid-automatic repeat request (HARQ) indicator channel (PHICH) group mapping of the cell; and
   means for performing, by the UE using the initial Mi hypothesis value, a Physical Downlink Control Channel (PDCCH) decode for a system information block (SIB) on the cell, wherein the SIB is SIB1.

8. The apparatus of claim 7, wherein the configuration information further comprises a location of the cell, and wherein the means for storing the obtained information for the cell in the cell information database includes means for storing the location of the cell in the cell information database, including means for caching data relating to at least one of positioning reference signals (PRS), observed time difference of arrival (OTDA), or determined global positioning system (GPS) coordinates, the apparatus further comprising:
   means for employing, by the UE, the configuration information for the cell in the cell information database, including the location information, to uniquely identify the cell.

9. The apparatus of claim 7, wherein the obtained information for the cell further includes closed subscriber group (CSG) capability information for the cell, and wherein the means for storing the obtained information for the cell in the cell information database includes means for storing the CSG capability information, the apparatus further comprising:
   means for employing, during initial frequency scan at power up of the UE, the cell information database to determine that the cell has CSG capability, and that another cell does not have CSG capability; and
   means for prioritizing initial acquisition on the cell based on the CSG capability of the cell even though it has a lower signal strength at the UE than the other cell not having CSG capability.

10. The apparatus of claim 7, wherein the obtained information for the cell further includes evolved Multimedia Broadcast Multicast Service (eMBMS) capability information for the cell, and wherein the means for storing the obtained information for the cell in the cell information database includes means for storing the eMBMS capability information, the apparatus further comprising:
- means for employing, during initial frequency scan at power up of the UE, the cell information database to determine that the cell has eMBMS capability, and that another cell does not have eMBMS capability; and
- means for prioritizing initial acquisition on the cell based on the eMBMS capability of the cell even though it has a lower signal strength at the UE than the other cell not having eMBMS capability.

11. The apparatus of claim 7, wherein the means for storing includes means for recording, in response to at least one of a radio link failure (RLF) or out of synch (OOS) event on the cell, a sequence of cell configuration information (CCI) of the cell and one or more CCIs of one or more previous cells previously acquired by the UE, wherein the configuration information includes the PCI, public land radio network (PLMN), and the earFCN of the cell, the method further comprising:
- means for determining a match between a current CCI sequence and one or more CCI sequences stored in the cell information database; and
- means for predicting, at least partly in response to the determining the match, at least one of a RLF or OOS event.

12. The apparatus of claim 11, wherein the means for storing further includes means for recording, at least partly in response to successful acquisition of another cell following at least one of occurrence or prediction of the RLF or OOS event, a CCI of the other cell as a solution associated with the sequence of CCI, the method further comprising:
- means for employing the solution associated with the sequence of CCI, at least partly in response to the predicting the RLF or OOS event, to preferentially acquire the other cell.

13. A non-transitory computer-readable medium having instructions recorded thereon that, when enacted by one or more processors, cause the one or more processors to:
- obtain, by a user equipment (UE), information for a cell, wherein the obtained information includes configuration information comprising a physical cell identity (PCI), a frequency (earFCN), and a bandwidth for the cell;
- store, by the UE, the obtained information for the cell in a cell information databases;
- employ, by the UE, the configuration information for the cell in the cell information database to determine an initial mutual information (Mi) hypothesis value for physical hybrid-automatic repeat request (HAW) indicator channel (PHICH) group mapping of the cell; and
- perform, by the UE using the initial Mi hypothesis value, a Physical Downlink Control Channel (PDCCH) decode for a system information block (SIB) on the cell, wherein the SIB is SIB1.

14. The non-transitory computer-readable medium of claim 13, wherein the configuration information further comprises a location of the cell, and wherein the instructions further cause the one or more computers to store the obtained information for the cell in the cell information database at least in part by storing the location of the cell in the cell information database, including caching data relating to at least one of positioning reference signals (PRS), observed time difference of arrival (OTDA), or determined global positioning system (GPS) coordinates, wherein the instructions further cause the one or more computers to:
- employ, by the UE, the configuration information for the cell in the cell information database, including the location information, to uniquely identify the cell.

15. The non-transitory computer-readable medium of claim 13, wherein the obtained information for the cell further includes closed subscriber group (CSG) capability information for the cell, and wherein the instructions further cause the one or more computers to store the obtained information for the cell in the cell information database at least in part by storing the CSG capability information, wherein the instructions further cause the one or more computers to:
- employ, during initial frequency scan at power up of the UE, the cell information database to determine that the cell has CSG capability, and that another cell does not have CSG capability; and
- prioritize initial acquisition on the cell based on the CSG capability of the cell even though it has a lower signal strength at the UE than the other cell not having CSG capability.

16. The non-transitory computer-readable medium of claim 13, wherein the obtained information for the cell further includes evolved Multimedia Broadcast Multicast Service (eMBMS) capability information for the cell, and wherein the instructions further cause the one or more computers to store the obtained information for the cell in the cell information database at least in part by storing the eMBMS capability information, wherein the instructions further cause the one or more computers to:
- employ, during initial frequency scan at power up of the UE, the cell information database to determine that the cell has eMBMS capability, and that another cell does not have eMBMS capability; and
- prioritize initial acquisition on the cell based on the eMBMS capability of the cell even though it has a lower signal strength at the UE than the other cell not having eMBMS capability.

17. The non-transitory computer-readable medium of claim 13, wherein the instructions further cause the one or more computers to store the information for the cell in the cell information database at least in part by recording, in response to at least one of a radio link failure (RLF) or out of synch (OOS) event on the cell, a sequence of cell configuration information (CCI) of the cell and one or more CCIs of one or more previous cells previously acquired by the UE, wherein the configuration information includes the PCI, public land radio network (PLMN), and the earFCN of the cell, wherein the instructions further cause the one or more computers to:
- determine a match between a current CCI sequence and one or more CCI sequences stored in the cell information database; and
- predict, at least partly in response to the determining the match, at least one of a RLF or OOS event.

18. An apparatus for wireless communication, the apparatus comprising:
- one or more processors configured to:
  - obtain, by a user equipment (UE), information for a cell, wherein the obtained information includes configuration information comprising a physical cell identity (PCI), a frequency (earFCN), and a bandwidth for the cell;
  - store, by the UE, the obtained information for the cell in a cell information database;

employ, by the UE, the configuration information for the cell in the cell information database to determine an initial mutual information (Mi) hypothesis value for physical hybrid-automatic repeat request (HARQ) indicator channel (PHICH) group mapping of the cell; and perform, by the UE using the initial Mi hypothesis value, a Physical Downlink Control Channel (PDCCH) decode for a system information block (SIB) on the cell, wherein the SIB is SIB1; and at least one memory coupled to the one or more processors.

19. The non-transitory computer-readable medium of claim 18, wherein the instructions further cause the one or more computers to store the configuration information for the cell in the cell information database at least in part by recording, at least partly in response to successful acquisition of another cell following at least one of occurrence or prediction of the RLF or OOS event, a CCI of the other cell as a solution associated with the sequence of CCI, wherein the instructions further cause the one or more computers to:

employ the solution associated with the sequence of CCI, at least partly in response to the predicting the RLF or OOS event, to preferentially acquire the other cell.

20. The apparatus of claim 18, wherein the configuration information further comprises a location of the cell, and wherein the one or more processors are further configured to store the obtained information for the cell in the cell information database at least in part by storing the location of the cell in the cell information database, including caching data relating to at least one of positioning reference signals (PRS), observed time difference of arrival (OTDA), or determined global positioning system (GPS) coordinates, wherein the one or more processors are further configured to:

employ, by the UE, the configuration information for the cell in the cell information database, including the location information, to uniquely identify the cell.

21. The apparatus of claim 18, wherein the obtained information for the cell further includes closed subscriber group (CSG) capability information for the cell, and wherein the one or more processors are further configured to store the obtained information for the cell in the cell information database at least in part by storing the CSG capability information, wherein the one or more processors are further configured to:

employ, during initial frequency scan at power up of the UE, the cell information database to determine that the cell has CSG capability, and that another cell does not have CSG capability; and prioritize initial acquisition on the cell based on the CSG capability of the cell even though it has a lower signal strength at the UE than the other cell not having CSG capability.

22. The apparatus of claim 18, wherein the obtained information for the cell further includes evolved Multimedia Broadcast Multicast Service (eMBMS) capability information for the cell, and wherein the one or more processors are further configured to store the obtained information for the cell in the cell information database at least in part by storing the eMBMS capability information, wherein the one or more processors are further configured to:

employ, during initial frequency scan at power up of the UE, the cell information database to determine that the cell has eMBMS capability, and that another cell does not have eMBMS capability; and prioritize initial acquisition on the cell based on the eMBMS capability of the cell even though it has a lower signal strength at the UE than the other cell not having eMBMS capability.

23. The apparatus of claim 18, wherein the one or more processors are further configured to store the configuration information for the cell in the cell information database at least in part by recording, in response to at least one of a radio link failure (RLF) or out of synch (OOS) event on the cell, a sequence of cell configuration information (CCI) of the cell and one or more CCIs of one or more previous cells previously acquired by the UE, wherein the configuration information includes the PCI, public land radio network (PLMN), and the earFCN of the cell, wherein the one or more processors are further configured to:

determine a match between a current CCI sequence and one or more CCI sequences stored in the cell information database; and predict, at least partly in response to the determining the match, at least one of a RLF or OOS event.

24. The apparatus of claim 23, wherein the one or more processors are further configured to store the configuration information for the cell in the cell information database at least in part by recording, at least partly in response to successful acquisition of another cell following at least one of occurrence or prediction of the RLF or OOS event, a CCI of the other cell as a solution associated with the sequence of CCI, wherein the one or more processors are further configured to:

employ the solution associated with the sequence of CCI, at least partly in response to the predicting of the RLF or OOS event, to preferentially acquire the other cell.

* * * * *